United States Patent [19]

Bachhofer et al.

[11] Patent Number: 4,661,128
[45] Date of Patent: Apr. 28, 1987

[54] AIR DESICCATING APPARATUS

[76] Inventors: Bruno Bachhofer, Säntisstrasse 85, 7981 Bavendorf; Anton Locher, Bergstrasse 6, 7981 Torkenweiler, both of Fed. Rep. of Germany

[21] Appl. No.: 741,163

[22] Filed: Jun. 4, 1985

[30] Foreign Application Priority Data

Jun. 27, 1984 [DE] Fed. Rep. of Germany ....... 3423561

[51] Int. Cl.$^4$ .............................................. B01D 53/02
[52] U.S. Cl. .......................................... 55/208; 55/33; 55/387
[58] Field of Search .................. 55/33, 162, 180, 208, 55/387; 423/581

[56] References Cited

U.S. PATENT DOCUMENTS

| 3,734,293 | 5/1973 | Biskis ................................ 55/208 X |
| 3,850,592 | 11/1974 | Huffman .................................. 55/33 |
| 4,087,260 | 5/1978 | Strathoff et al. ................... 55/208 X |

FOREIGN PATENT DOCUMENTS 1521297 8/1978 United Kingdom .................. 55/162

OTHER PUBLICATIONS

Deltech Air Dryer, "Delivers Clean, Dry Compressed Air", Form 300, 1967.

Primary Examiner—Charles Hart
Attorney, Agent, or Firm—Spencer & Frank

[57] ABSTRACT

An air desiccating apparatus (13) consists of a tank (1') which is filled with a hygroscopic desiccator substance and thermally insulated relative to its surroundings and exhibits a heater element (8'), by means whereof the desiccator substance can be regenerated by heating and evaporation. To permit such an apparatus (13) to be used also in warm rooms (25° C. for example) and at very high air humidity, measures are adopted for cooling the desiccator substance with ambient air during the desiccation process. Particularly if the thermal insulation of the tank (1') results from the fact that it is surrounded by a condenser bell (15) and the latter in turn by a housing (17), whereby the steam produced during regeneration can be condensed, it is proposed that the tank (1') be penetrated by cooling pipes (3'). A fan (21) forces cooling air upwards through the latter and positively down again between the external surface of the tank and the condenser bell (15). A desiccated air consumer can be supplied uninterruptedly by the alternate service of two desiccators (13).

10 Claims, 4 Drawing Figures

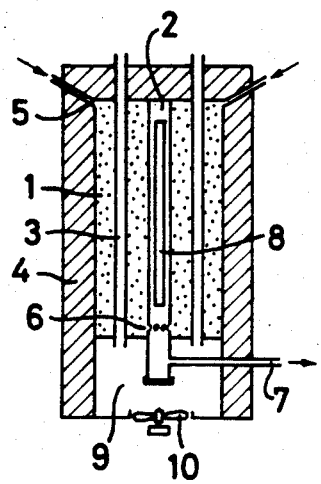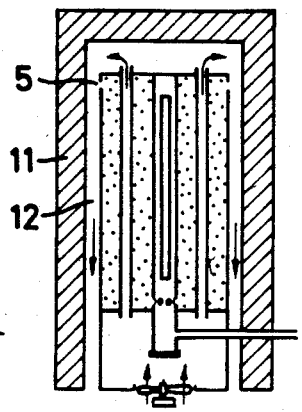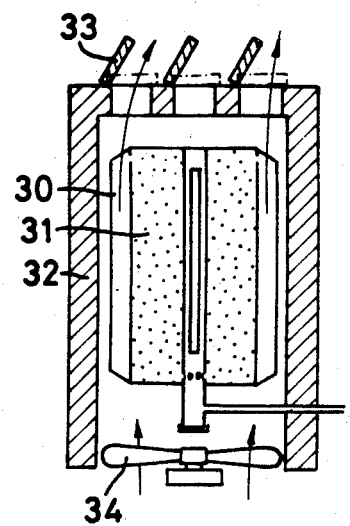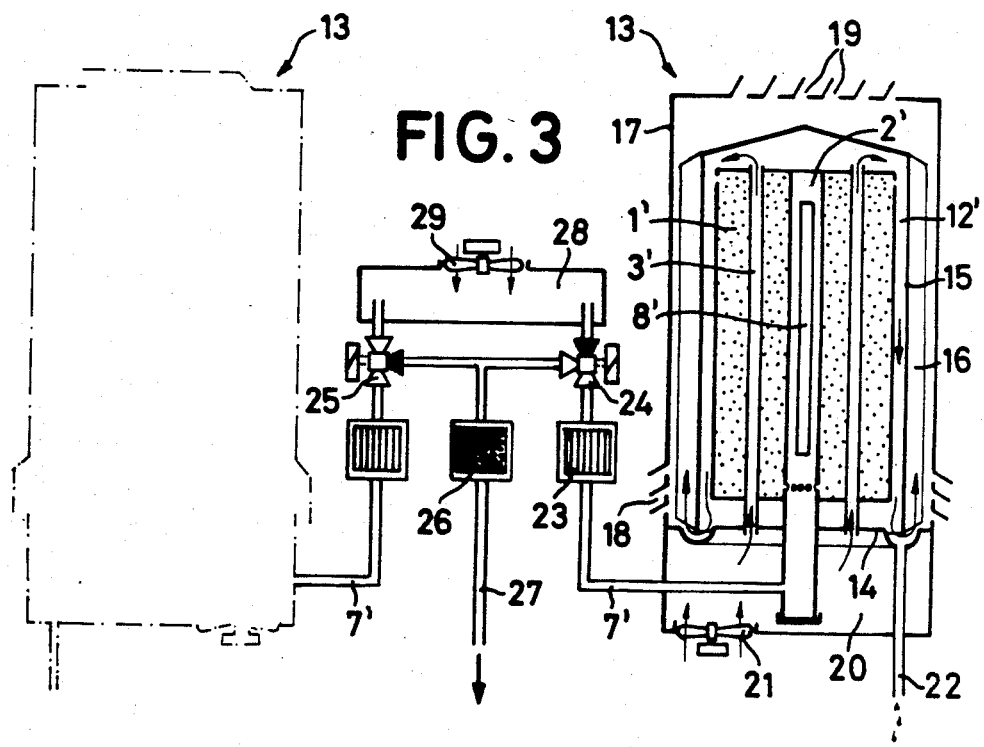

4,661,128

AIR DESICCATING APPARATUS

BACKGROUND OF THE INVENTION

The invention relates to an air desiccating apparatus with a tank which is filled with a preferably granular desiccator substance which adsorbs moisture, which is thermally insulated relative to its surroundings and which exhibits inlet orifices and outlet orifices, and with a heater element arranged in the tank, by means whereof the desiccator substance can be regenerated by heating and evaporation. The thermal insulation of the tank serves to permit the desiccator substance to be heated more uniformly during the regeneration process, and to economise energy. The operating temperature during the regeneration process is approximately 180°.

No such apparatus, the tank of which is simply surrounded by a layer of thermal insulation material, can be traced. However, a corresponding apparatus for desiccating the process air of an ozone generator is known from German Offenlegungsschrift No. 2,937,070, published Apr. 2, 1981. This apparatus has the special feature that the steam expelled from the desiccator substance during the regeneration process can be fully condensed and the condensate collected in a liquid tank. For this purpose the tank filled with the desiccator substance is enveloped by a metal bell, which is in turn surrounded by a housing open at the bottom and at the top. Clear interstices are present between the tank, the bell and the housing respectively, so that this arrangement, including the air cushions, has an overall thermal insulation effect.

It has now been discovered that the thermal insulation of the tank which is desired in the regeneration phase is disadvantageous when the apparatus is erected in a warm room at approximately 25° or higher, particularly if a high air humidity prevails. Heat is evolved during the adsorption of the moisture on the desiccator substance during the desiccation process, namely the more so as the air to be desiccated is more humid. At a correspondingly high room temperature, as mentioned, localization of heat therefore occurs with such high temperatures in the desiccator substance that an equilibrium state results between accumulated water molecules and those released again, so that the desiccating apparatus becomes ineffective.

SUMMARY OF THE INVENTION

The underlying object of the invention is to render the apparatus suitable for use even in humid warm rooms, such as in indoor swimming pools and in the technical service rooms attached to such installations, for example.

This object is achieved according to the invention, starting from an air desiccating apparatus of the type initially designated, when measures are adopted for cooling the desiccator substance with ambient air during the desiccation operation.

This solution embraces all cooling measures which do not impair, and/or which maintain, the effective thermal insulation during the regeneration process.

It is preferably proposed to achieve the cooling of the desiccator substance in that the tank is penetrated by cooling pipes into which ambient air is blown. Particularly in the case of an elongate upright tank, a convenient structural form consists in that a plurality of straight cooling pipes oriented in the longitudinal direction of the tank are provided, which are open at the top and lead at the bottom into a common blast chamber, and that a blower is provided which forces ambient air into the blast chamber and upwards through the cooling pipes. In this case the cooling pipes are passed through the thermal insulation layer at the top. In the regeneration phase the blower is switched off and the passage of air is optionally additionally shut off by flaps or the like.

A preferred further development of the invention is that the thermal insulation arrangement comprises a bell inverted over the tank, whilst a clear interstice is present between bell and tank and whilst the cooling pipes lead into the interior space of the bell at the top side of the tank. The bell, which may consist of a thermal insulation material, performs its thermal insulation function perfectly, because the warm air accumulates beneath it during the regeneration process. During the desiccation process, that is to say, so long as the desiccator substance is cooled, a different pattern of the cooling air is obtained with greater efficacity. The air in fact rises in the cooling pipes, but is then deviated by the bell and travels back downwards along the external surface of the tank. The air therefore has a double opportunity to absorb heat and the cooling is thereby intensified. Such an arrangement is uncomplicated and therefore particularly reliable in operation. Shut-off elements for the cooling airstream may be omitted. A small blade fan dimensioned for long-term service, which is switched on and off, is sufficient as a blower.

This cooling arrangement is especially also suitable for condensing air desiccating apparatuses, where the bell consists of a thin thermally conductive material and is surrounded, so as to leave a clear interstice, by an external housing which, by a chimney effect (during the regeneration process), externally cools the bell which is preferably provided with cooling fins. The bell therefore becomes a condenser, in that the steam generated during the regeneration precipitates on it.

An alternative embodiment form of the invention, which dispenses with the condensate recovery, is that the tank is surrounded by an insulating bell which can be opened and closed selectively at the top, and a cooling air gap is provided between the latter and the tank. In this case it is sufficient, during the desiccation process, to open flaps, attached to the bell for example, whereby the air rising up in the bell and flowing round the exterior of the tank cools the latter. In this case, the tank itself may exhibit cooling fins on its external surface, and the rising cooling airstream may preferably be supported by a fan.

A further improvement of the described apparatuses is that a fan is provided which forces air through the outlet orifices into the tank during the regeneration process. In this case it is intended to generate, not an airstream in the proper sense, but only a very slight positive pressure at the outlet orifices of the tank, which is just sufficient to prevent steam from entering the air outlet pipe and condensing there. It is intended on the contrary to make the steam clouds leave the tank through the air inlet orifices located at the top and travel slowly downwards along the bell, which is optionally constructed as a condenser. The outlet pipe is shut off towards the desiccated air consumer, and opened towards the regenerating fan, during the regeneration process by means of a three-way valve.

Because desiccation processes and regeneration processes follow each other alternately in the described apparatus, the supply to the following desiccated air consumer is repeatedly interrupted. In order to ensure an uninterrupted supply, it is therefore proposed that two tanks operable alternately as desiccators are provided, which supply uninterruptedly to at least one common desiccated air consumer. The service of an apparatus duplicated in this way is controlled automatically by a timer so that the one apparatus is always being regenerated, whilst the other one operates as a desiccator and vice versa. A single regeneration fan is sufficient for the duplicate apparatus.

The described cooling of the desiccator substance ensures that it is impossible, even in extremely warm and humid service rooms, for a localization of heat to occur in the desiccator bed, the temperature of which is on the contrary always kept at a level at which effective air desiccation is ensured. In the second place, the cooling shortens the time for restoring the desiccator to readiness after the regeneration. The thermal insulation of the tank per se causes the temperature of the desiccator substance to fall back only very slowly from 180° C. to the service temperature. However, the cooling measures described cancel the insulation effect and therefore shorten the waiting time, which ultimately has the effect that the desiccator capacity is considerably increased and/or the tank can be constructed smaller for a given desiccator capacity. If two alternately operable desiccators are provided, then it is only necessary for the moisture absorption capacity of the one to bridge the regeneration time and the restoration to readiness time of the other one.

BRIEF DESCRIPTION OF THE DRAWINGS

Examples of construction of the invention are described below with reference to the drawing, wherein specifically:

FIG. 1 shows a schematic longitudinal section of a first embodiment of an air desiccator according to the invention with a thermal insulation layer in contact with the tank;

FIG. 2 shows a schematic longitudinal section of another embodiment of an air desiccator according to the invention with the insulating bell;

FIG. 3 shows a diagram of an air desiccation apparatus with two individual condensing desiccators according to still a further embodiment of the invention, with one of the air desiccators being illustrated in longitudinal section; and FIG. 4 shows a schematic longitudinal section of an air desiccator with external cooling means according to another embodiment of the invention.

DETAILED DESCRIPTION OF THE PREFERRED EMBODIMENTS

The air desiccator according to FIG. 1 consists of a cylindrical tank 1, into which a central pipe 2 overhanging downwards is inserted tightly. A bank of axially parallel cooling pipes 3, which penetrate tightly the bottom and top end surfaces of the tank 1, is located round the central pipe 2. The cooling pipes 3 are prolonged towards the top and passed through an insulation means 4 made of thermal insulation material surrounding the tank 1. The annular space within the tank, which surrounds the central pipe 2 and is penetrated by the cooling pipes 3, is filled with a granular desiccating medium. This medium has the property to adsorb air humidity and to surrender it again in the form of steam when heated. Inlet orifices 5, from which—in this example—inclined small tubes lead outwards through the insulation means 4, are provided all round at the top edge of the tank 1. On the other hand, the annular space is in communication, via outlet orifices 6 in the central pipe 2 near the tank bottom, with an outlet pipe 7 leading away from the central pipe 2. The latter is connected to the suction side of a pump, not shown, which conveys the desiccated air to a consumer. The central pipe 2 is closed tightly at the bottom. It contains a rod-shaped electric heater element 8. The space, located beneath the tank bottom, from which the cooling pipes 3 start, forms a blast chamber 9. The latter is charged with cooling air from the surroundings by a fan 10 arranged in its bottom surface.

In the case of the apparatus according to FIG. 1, during desiccation service the air sucked in through the inlet orifices 5 sweeps downwards through the desiccating medium. It is thereby relieved of moisture and leaves the annular space again through the outlet orifices 6 and the outlet conduit 7 to the desiccated air consumer, an ozone generator for example. Heat of condensation is evolved by the adsorption of moisture on the desiccating medium. The fan 10 therefore runs in this service state and the cooling air rising through the cooling pipes 3 discharges this heat to the ambient air.

After the expiry of a given time interval determined by empirical values, the so-called desiccation phase, the pump sucking at the pipe 7 is switched off, and the heater element 8 is switched on instead. The temperature of the desiccating medium now rises so that the accumulated moisture evaporates out via the inlet orifices 5. It is assumed for this purpose that the apparatus is located in a sufficiently large or continuously ventilated service room, so that this waste steam is not troublesome. The regeneration phase lasts approximately five hours at a temperature of 180° C.

The apparatus according to FIG. 2 differs from that according to FIG. 1 in that, instead of an insulation means in contact with the tank 1, an insulating bell 11 is provided which is spaced from the tank 1, so that a clear interstice 12, open towards the bottom, is created. The thermal insulation effect of the insulating bell 11 is scarcely impaired by this arrangement. Further differences from FIG. 1 consist in that the cooling pipes 3 lead by their top ends directly into the interstice 12 beneath the insulating bell 11, and the extension tubes at the inlet orifices 5 are also absent.

In the desiccation phase, with the apparatus according to FIG. 2 the flow path of the process air, starting at the inlet orifices 5, is again as described in FIG. 1 and designated by arrows. The cooling air on the other hand is deviated at the top by the insulating bell 11 and guided positively downwards through the interstice 12. This is indicated by arrows here. Likewise in the regeneration phase, during which the fan 10 is at rest, it is necessary for the steam leaving through the inlet orifices 5 to flow away downwards. This can be achieved more satisfactorily by a so-called regeneration fan, which provides a positive pressure via the outlet conduit 7.

Two different, although mutually totally identical, desiccators 13 are provided in the apparatus according to FIG. 3. As in FIG. 1, here again a tank 1' with desiccating medium, a central pipe 2', cooling pipes 3' and an outlet conduit 7' are present. A heater element 8' in the central pipe 2' is also provided. The cooling pipes 3' are prolonged downwards and also passed tightly through an intermediate plate 14. The tank 1' is enveloped by a metal condenser belt 15 open towards the bottom, and separated from the latter by an interstice 12'. The condenser bell 15 has cooling fins 16 externally and is in turn surrounded by a housing 17. The latter is divided by the intermediate plate 14 into an upper part with lateral and upper ventilation slits 18 and 19, and into a lower part, namely a blast chamber 20. The latter is charged with cooling air from the surroundings by a fan 21 arranged in its bottom surface. An annular drip channel, from which a pipe section 22 is passed out downwards, is shaped in the intermediate plate 14 beneath the bottom edge of the condenser bell 15.

The circuit diagram according to FIG. 3 further shows that the outlet pipes 7' of both the desiccators 13 are passed via filters 23 and solenoid-operated three-way valves 24 and 25 to an indicator 26, to which a common outlet pipe 27 is connected. A pump, not shown, conveys the desiccated air, produced here uninterruptedly, to the consumer. The third connections of the three-way valves 24 and 25 are connected to a blast chamber 28, in the wall of which a fan 29 is inserted tightly, which generates a slight positive pressure therein.

This apparatus again is controlled by a timer. The fan 29 runs uninterruptedly, the fans 21 of both the desiccators respectively run only in the desiccation phase and in the restoration of readiness phase. In the assumed initial situation, the left-hand desiccator 13 is in the regeneration phase. The three-way valve 25 is switched through from the top downwards and the heating means of the left-hand desiccator 13 is in service. The right-hand desiccator 13 is in the desiccation phase. The three-way valve 24 connects the air filter 23 to the indicator 26. The latter contains a packing of a particular desiccation medium with colour indicator, which is made visible through a glass window. As in the case of the desiccator according to FIG. 1, air is sucked through the inlet orifices into the tank 1'. It passes via the outlet orifices into the central pipe 2' and from there via the outlet conduit 7', the dust filter 23, the three-way valve 24 and the indicator 26 to a common outlet conduit 27.

The process heat evolved is dissipated by the cooling system. The cooling air conveyed by the fan 21 rises in the cooling pipes 3' and then flows back in the interstice 12' along the wall of the tank 1' to the bottom, where it sweeps round the bottom edge of the condenser bell 15 and then leaves the housing 17 through its ventilation slits 18 and 19. The cooling pipes 3' pass centrally through the desiccating medium bed and thus dissipate the heat from where it is evolved.

When the regeneration phase in the left-hand desiccator 13 is complete, the associated heating means is switched off and the relevant cooling air fan 21 is brought into service. After sufficient cooling this desiccator stands by in readiness until the desiccating medium in the right-hand desiccator 13 is saturated with moisture. Now the two three-way valves 24 and 25 are commutated and the regeneration phase commences in the right-hand desiccator with the switching on of the heater element 8'. The positive pressure in the blast chamber 28 then causes the steam forming in the desiccation medium to escape exclusively through the top inlet orifices of the tank 1', and not to fall in the central pipe 2'. Due to the low power of the fan 29 and to the high flow resistance in the desiccating medium, scarcely any airstream develops. However, the steam clouds drift definitely upwards in the tank 1' and then sweep downwards along the internal wall of the condenser bell 15. However, the condenser bell 15 is cooled by the air entering at the lateral ventilation slits 18 and sweeping upwards on the cooling fins 16. The steam clouds therefore condense totally on the condenser bell 15. The condensate drips into the channel of the intermediate plate 14 at the bottom edge of the bell, collects there and flows out downwards through the pipe section 22 into a collecting tank for example.

Meanwhile the left-hand desiccator 13 is in the desiccation phase and supplying the desiccated air consumer. Should, contrary to all expectation, and as a result of an operating error or a fault, moist air enter the common outlet conduit 27, then the colour of the desiccating medium in the indicator 26 would change from, for example, blue to pink, whereby the service personnel would quickly be made aware of the fault.

The special feature of the exemplary embodiment according to FIG. 4 lies in the fact that no cooling pipes, but instead cooling fins 30, are provided on the otherwise unchanged tank 31. It is surrounded by an insulating bell 32, which exhibits large apertures at the top which can be closed by flaps 33, and a fan 34 at the bottom. In the regeneration phase the flaps 33 are closed and the fan 34 at rest. In the restoration of readiness phase and the desiccation phase on the other hand, the flaps 33 are opened and the fan 34 blows cooling air from beneath through the insulation bell 32, so that the process heat is dissipated on the external surface of the tank and its cooling fins 30.

We claim:

1. An air desiccating apparatus comprising: a tank which is filled with a preferably granular desiccator substance which absorbs moisture, and which is provided with air inlet orifices and outlet orifices; thermal insulating means disposed around said tank for thermally insulating said tank relative to its surroundings; a heater element arranged in said tank and by means of which said desiccator substance can be regenerated by heating and evaporation; and cooling means for cooling said desiccator substance with ambient air during the desiccation process, said cooling means including a plurality of straight cooling pipes which are oriented in the longitudinal direction of said tank and extend through said tank and said desiccating substance contained therein, with said pipes being open at the top and leading at the bottom into a common blast chamber, and a blower which forces ambient air into said blast chamber and upwards through said cooling pipes.

2. An apparatus as claimed in claim 1, wherein said thermal insulation means comprises a bell inverted over said tank and spaced therefrom to provide a clear interstice between said bell and said tank; and wherein the tops of said cooling pipes open into the interior space of the bell at the top side of said tank.

3. An apparatus as claimed in claim 2, wherein said bell consists of a thin, thermally conductive material and said thermal insulation means further includes an external housing means, which surrounds said tank so as to leave a clear interstice, for externally cooling said bell, which is preferably provided with cooling fins, by a chimney effect.

4. An apparatus as claimed in claim 1, wherein a fan is provided which forces air through said outlet orifices into said tank during the regeneration process.

5. An apparatus as claimed in claim 1, wherein two apparatuses operable as desiccators alternately are provided, which supply uninterruptedly to at least one common desiccated air consumer.

6. An air desiccating apparatus as claimed in claim 1 wherein said thermal insulating means is in contact with said tank, and wherein the upper open ends of said plurality of cooling pipes extend through said insulating means.

7. An air desiccating apparatus as claimed in claim 2 wherein said bell is formed of insulating material.

8. An air desiccating apparatus as claimed in claim 3 wherein: said external housing means has a horizontally extending plate which divides said housing means into an upper portion containing said bell and said tank, and a lower portion forming said blast chamber, with said plate being spaced from the respective lower ends of said bell and said tank; the lower ends of said cooling tubes extend through said plate; and said upper portion of said external housing means is provided with ventilation slits in its lateral surface adjacent said plate and in its upper surface.

9. An air desiccating apparatus as claimed in claim 8 wherein said plate is provided with a drip channel below the lower edge of said bell and a discharge pipe for any condensate collecting in said drip channel.

10. An air desiccating apparatus as defined in claim 1 further comprising a further pipe extending along the longitudinal axis of said tank; and wherein: said heater element is disposed within said further pipe; said outlet orifices are formed in said further pipe adjacent the lower end of said tank; and said inlet orifices are disposed adjacent the upper end of said tank.

* * * * *